United States Patent

Joo et al.

[15] 3,681,401
[45] Aug. 1, 1972

[54] PRODUCTION OF 1,4-NAPHTHOQUINONE

[72] Inventors: Louis A. Joo, Johnson City; Loren A. Bryan, Elizabethton, both of Tenn.

[73] Assignee: Great Lakes Carbon Corporation, New York, N.Y.

[22] Filed: Dec. 22, 1966

[21] Appl. No.: 603,730

[52] U.S. Cl. ............................................. 260/396 R
[51] Int. Cl. .............................................. C07c 49/66
[58] Field of Search .......................... 260/396, 396 R

[56] References Cited

UNITED STATES PATENTS 2,402,226   6/1946   Hyman et al. ................. 260/396

*Primary Examiner*—Lorraine A. Weinberger
*Assistant Examiner*—L. Arnold Thaxton
*Attorney*—Armand McMillan

[57] ABSTRACT

Naphthalene in carbon tetrachloride has been oxidized by chromic acid to 1,4-naphthoquinone, the reaction being controlled by gradual addition of the sulfuric acid to the otherwise complete naphthalene-sodium dichromate-water-carbon tetrachloride reaction mixture. The yield of naphthoquinone has now been increased to about 60 percent, based on the naphthalene charge, by maintaining the weight ratio of carbon tetrachloride to naphthalene at a level within the range of 0.3:1 to 3:1.

2 Claims, No Drawings

PRODUCTION OF 1,4-NAPHTHOQUINONE

This invention relates to an improvement in the method for oxidation of naphthalene to 1,4-naphthoquinone in the presence of an organic solvent. More particularly, it relates to an improved method for the manufacture of naphthoquinone by direct oxidation of naphthalene with hexavalent chromium at an increased yield.

REVIEW OF PRIOR ART

There are many processes outstanding in the art for the production of naphthoquinone, an important compound with fungicidal properties that has been widely used as an intermediate in the synthesis of dyes and fungicidal derivatives well accepted in agriculture and in the textile industry.

Some of the methods which have been used in the past involve the vapor phase oxidation of naphthalene with air over a stabilized vanadium oxide catalyst. The usefulness of the vapor phase oxidation method has been discounted severely by the difficulties experienced in obtaining good quinone from the oxidate mixtures, contaminated as they are with, among other things, 10 percent to 40 percent of unconverted original naphthalene. Another type of approach to naphthoquinone which is still in current use calls for the condensation of benzoquinone with butadiene. The shortcomings of such a process in number of chemical steps, time consumption and apparatus requirement can readily be imagined when it is considered that the synthesis of benzoquinone must first be carried out before any naphthoquinone manufacture is attempted.

A simpler approach has been followed by many. It consists essentially in the direct oxidation of naphthalene by hexavalent chromium in a liquid medium. Four main methods have been devised to implement this approach. These require the use of various proportions of a chromium compound such as chromic anhydride or sodium dichromate and acetic acid or a mineral acid such as sulfuric acid. Most of these methods are slow, yield relatively low quantities of the quinone and favor the production of phthalic acid.

One of the methods however, that of Hyman and Peters described in U.S. Pat. No. 2,402,226, involves the innovation of adding to the chromic acid system ($Na_2Cr_2OB7=H_2SO_4$), 5 to 50 volumes, based on the naphthalene, of an inert immiscible solvent such as carbon tetrachloride. The solvent, acting as a vehicle or carrier for the naphthalene, provides a second phase which overlays the solution of oxidizing agent. By good agitation and control of the reaction temperature through selection of a solvent with the appropriate reflux temperature, yields of naphthoquinone of about 40 percent are achieved. When a beta-substituted naphthalene is oxidized under these conditions, strikingly better yields of the corresponding quinones are obtained, e.g. 85 percent to 90 percent in the case of the monomethyl compound and nearly quantitative yields for the dimethyl isomers.

OBJECTS OF INVENTION

It is an object of this invention to maximize the yield of α-naphthoquinone in the direct oxidation of naphthalene with hexavalent chromium.

Another object is to increase the conversion of naphthalene to the point where the unconverted starting material does not significantly handicap the recovery of good quality naphthoquinone. Another object is to affect the ratio of naphthoquinone to phthalic acid in such a manner that the production of naphthoquinone is strongly favored. Still another object is to effect economies in equipment and reagents to an extent that the process of the invention can seriously challenge current production methods such as the benzoquinone-butadiene condensation.

SUMMARY OF INVENTION

These and other objects which shall become apparent in the course of the ensuing disclosure, have been accomplished by drastically altering the weight ratio of solvent to naphthalene employed in the chromium compound oxidation process to a level within the range of from about 0.3:1 to about 3:1. This change in reaction conditions has resulted in the obtention of an average naphthalene conversion of about 90 percent, an average yield of α-naphthoquinone of about 58 ± 2 percent and an average naphthoquinone to phthalic acid yield ratio of 2.26 ± 0.10:1. That such possibilities lay hidden in departing from the process as specified by Hyman and Peters was unpredictable in view of the fact that it had been established that the better yields of quinone were obtained at the higher dilution volumes. To obtain therefore an average increase in yield of close to 50 percent by weight by reducing the minimum recommended ratio to the maximum which is less than half of the former while not encountering the difficulties which originally led to the use of a diluent is, to say the least, surprising. No less surprising is the fact that when other solvents are used, such as benzene, which have been proposed as equivalents of carbon tetrachloride, neither the maximization of the yield nor the improvement of the naphthoquinone to phthalic acid ratio is achieved by a reduction of solvent concentration of the magnitude recommended by the present invention.

DETAILED DESCRIPTION

The following examples and procedures will illustrate the invention in executional detail. These examples are not to be construed however as limitations of the invention other than those embodied in the appended claims. All parts and percentages given in the illustrations shall be on a weight basis unless otherwise noted.

Oxidation Procedure No. 1

Sodium dichromate dihydrate, 366 parts, is dissolved in 50° C water, 136 parts, and the resulting solution is placed in the reaction vessel along with carbon tetrachloride, 126 parts, and naphthalene, 90 parts. This gives a solvent to naphthalene ratio of 1.4:1 or, on a volume basis, 1:1. Only part of the naphthalene dissolves under these conditions. The reaction vessel is equipped with means to reflux, distill, stir, cool and heat. With vigorous stirring of the content of the vessel, there is then added dilute sulfuric acid, 534 parts 95 percent sulfuric acid in 125 parts water, at a rate consistent with maintenance of a temperature of about 40° C or less in the reaction mixture. The addition takes from 60 to 90 minutes. Once it is completed, the reaction mixture is warmed to about 60° C and is maintained at that temperature for about 90 minutes. The stirring is continuous. At the end of this period, the heating rate is increased and the carbon tetrachloride distills off between 66° and 90° C. After the distillation has been completed, the residue is cooled to a temperature below 50° C by dilution with cold water or ice and the material is filtered. The cake is washed until free of chromium salts and dried in a forced draft oven at 80° C. The naphthoquinone is then separated from the byproduct phthalic acid and from residual naphthalene by conventional methods or modifications thereof.

The effect of varying the ratio of solvent to naphthalene in preparations made according to the oxidation method No. 1 are given in Table 1.

TABLE 1

| Example | $CCl_4$: $C_{10}H_8$[1] Weight | Yield %[2] 1,4-Naphthoquinone | Phthalic Acid | Apparent Naphthalene Conversion %[3] |
|---|---|---|---|---|
| 1 | 0 | 20 | 22.9 | 62 |
| 2 | 0.72 | 51 | 24.7 | 86 |
| 3 | 1.40 | 57 | 22.8 | 90 |
| 4 | 3.96 | 45 | 23.6 | 83 |
| 5 | 5.56 | 41 | 25.0 | 77 |

(1) Based on weight charged; the purity (assay) was 89% $C_{10}H_8$
(2) Based on naphthalene in the charge
(3) Based on naphthalene disappearing in the reaction An examination of the data in Table 1 reveals a significant increase in the yield of naphthoquinone when naphthalene is oxidized in a solvent-poor medium. It is indeed remarkable that such an improvement is obtained at solvent to substrate ratios which have been adjusted in a direction opposed to the teachings of the prior art and to levels beyond those which have previously been employed.

Oxidation Procedure No. 2

A second method which illustrates the invention is carried out in apparatus that is the same as that used for Procedure No. 1, except that the volume of the reactor is reduced by one-half. This procedure differs from the first one in that the chromic acid necessary to oxidize the naphthalene is formed before addition to the naphthalene slurry, while in Procedure No. 1, it is formed in situ, as needed, by the gradual addition of sulfuric acid to the otherwise complete reaction mixture. The latter technique is more desirable, as shown by the results.

Sodium dichromate dihydrate, 184 parts, is dissolved in water, 206 parts, and to the resulting solution is gradually added 268 parts of 95 percent sulfuric acid. The reactor in turn is charged with naphthalene, 45 parts, and carbon tetrachloride, 63 parts. This corresponds to a solvent to naphthoquinone weight ratio of 1.4:1 or volume ratio of 1:1. With vigorous stirring of the reactor contents, the chromium solution is added over a period of two hours while the temperature of the reactants is maintained at about 40° C or less. The stirring is continued for 30 to 45 minutes after the addition of the oxidant is completed. The reaction mixture is then heated with continual stirring until its temperature has reached 90° C. After the distillation of the carbon tetrachloride has terminated, the residue in the reactor is poured into cold water or over cracked ice, 200 to 300 parts. When the mixture has cooled to about room temperature, it is filtered. The cake is washed free of chromium salts and dried in a forced draft oven for one to two hours. The product may then be recovered according to conventional or other methods.

Variations of solvent to naphthalene ratio within the limits shown in Examples 6, 7 and 8 have given the results tabulated below when carried out as part of Procedure No. 2.

TABLE 2

| Example | $CCl_4$: $C_{10}H_8$[1] Weight | Yield %[2] 1,4-Naphthoquinone | Phthalic Acid | Apparent Naphthalene Conversion %[3] |
|---|---|---|---|---|
| 6 | 1.40 | 40 | 24 | 78 |
| 7 | 2.71 | 37 | 15 | 65 |
| 8 | 3.98 | 28 | 17 | 69 |

(1) Based on weight of charge; purity (assay) 95.5% $C_{10}H_8$
(2) Based on naphthalene charged
(3) Based on naphthalene disappearing in the reaction Again the yield and conversion of naphthalene is highest at a solvent to naphthalene ratio of 1.4:1.

It thus becomes evident that the selection of the preferred ratio of solvent to naphthalene permits greater efficiency to be obtained through maximum conversion and highest yield for the given system under a fixed set of conditions. With carbon tetrachloride this preferred ratio lies within the range of about 0.3:1 to 3:1 on a weight basis, which corresponds to a volume ratio range of approximately 0.2:1 to 2.2:1.

The nature of the reaction of instant interest as well as the conditions under which it is performed narrow considerably the choice of usable solvents. These must be organic liquids capable of dissolving naphthalene and α-naphthoquinone to some extent. They must be immiscible with water and of course fairly resistant to chromic acid oxidation. Temperature requirements for reaction and recovery further limit the choice to liquids having a boiling point not greater than about 100° C. Thus, while it is conceivable that some degree of improvement in naphthoquinone production could be obtained by the exercise of this invention with solvents that do not meet all these stringent requirements, it has been found that the best yields of naphthoquinone with the least net consumption of solvent, reactants and energy, have been obtained with carbon tetrachloride used at a ratio to naphthoquinone of about 1.4:1 on a weight basis, or about 1:1 on a volume basis.

What is claimed is:

1. In the process of oxidizing naphthalene to alpha-naphthoquinone by subjecting naphthalene in the presence of carbon tetrachloride to the action of an oxidant consisting essentially of an aqueous solution of a hexavalent chromium compound and a mineral acid while intensively agitating the reaction mixture, the improvement comprising limiting the weight ratio of carbon tetrachloride to naphthalene to the range of 0.3:1 to 3:1 and maintaining the reaction mixture at a temperature not greater than about 40° C at least until the completion of the addition of said oxidant.

2. The process of claim 1 wherein the carbon tetrachloride to naphthalene ratio is about 1.4:1 on a weight basis.

* * * * *